UNITED STATES PATENT OFFICE.

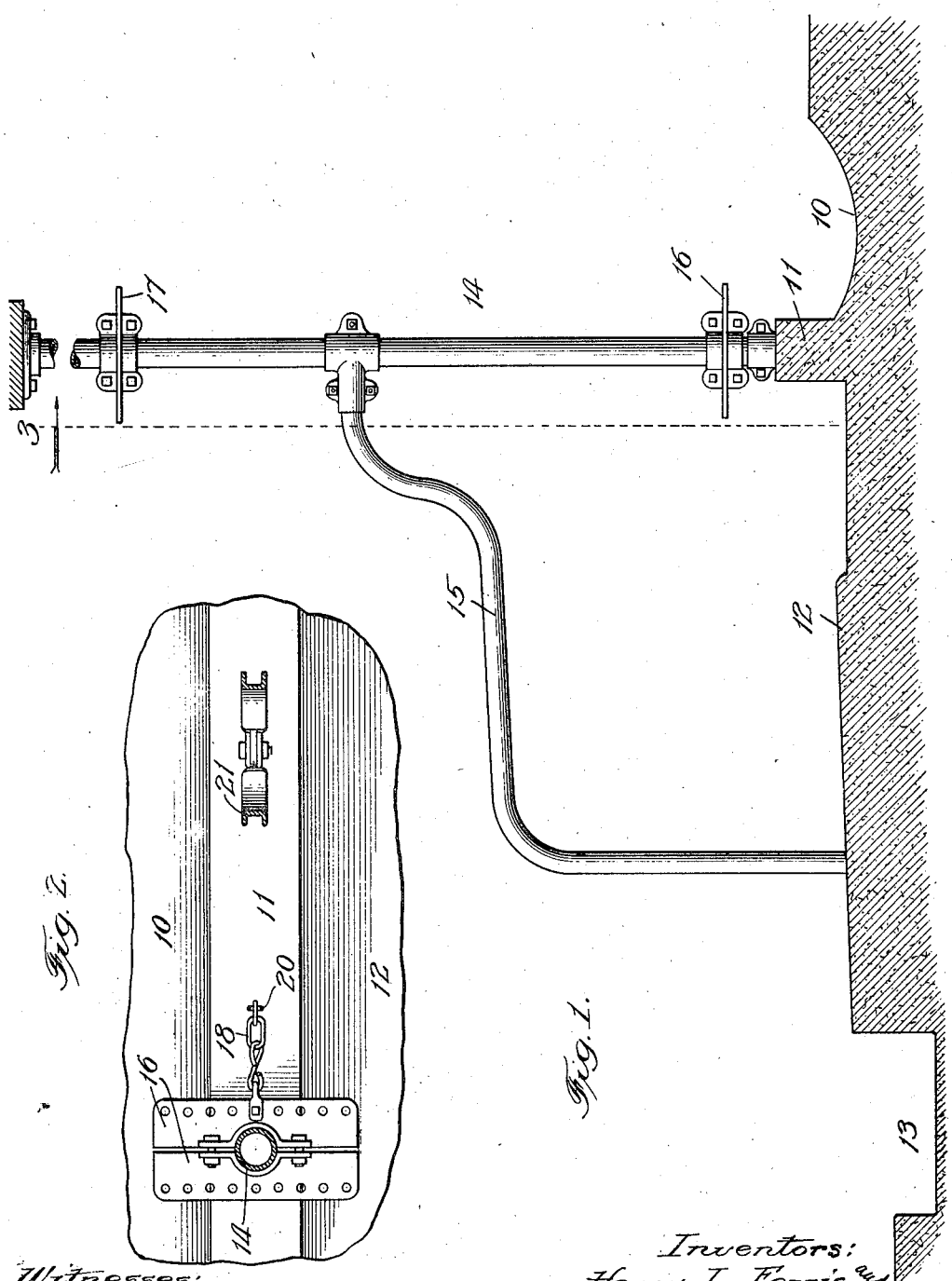

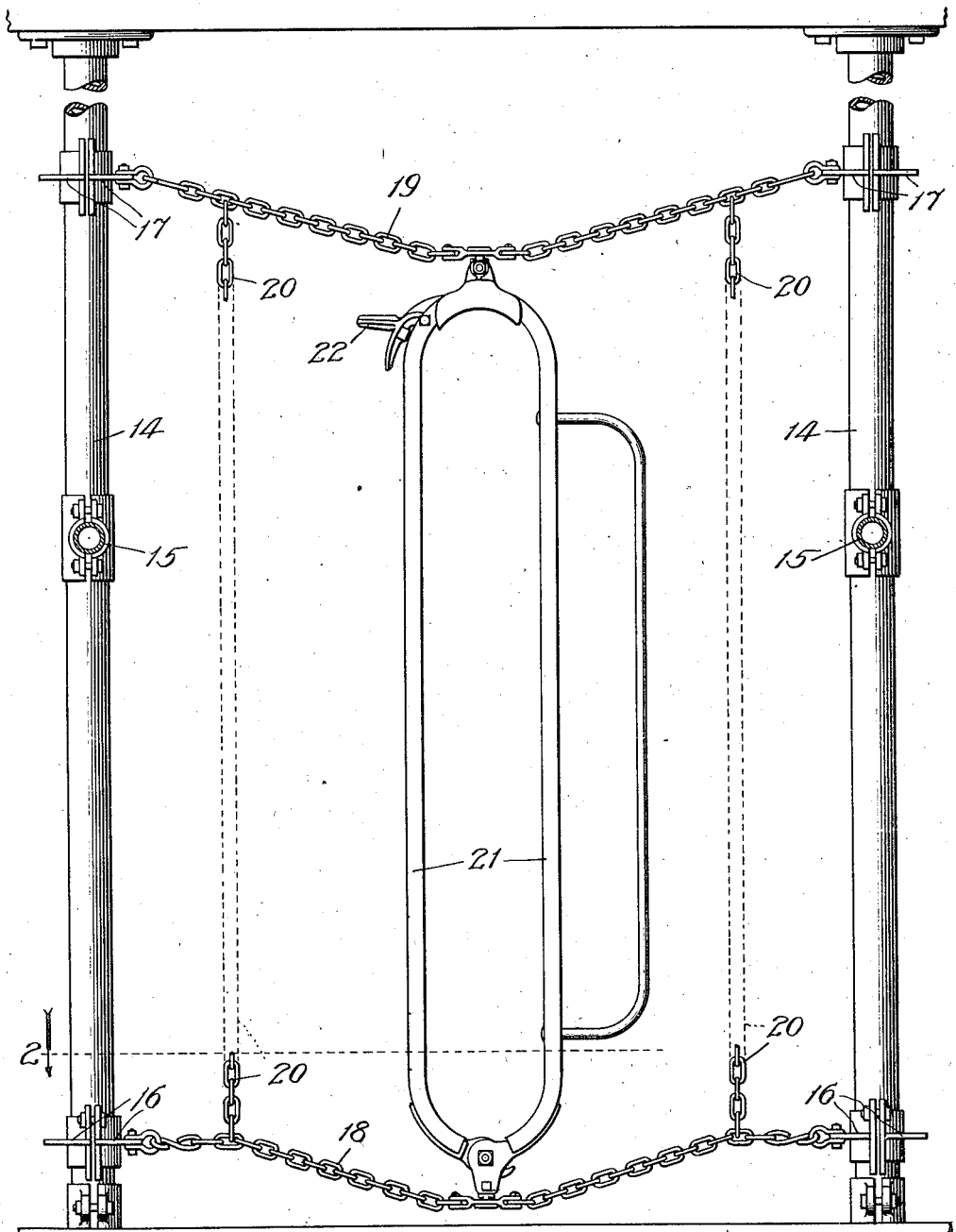

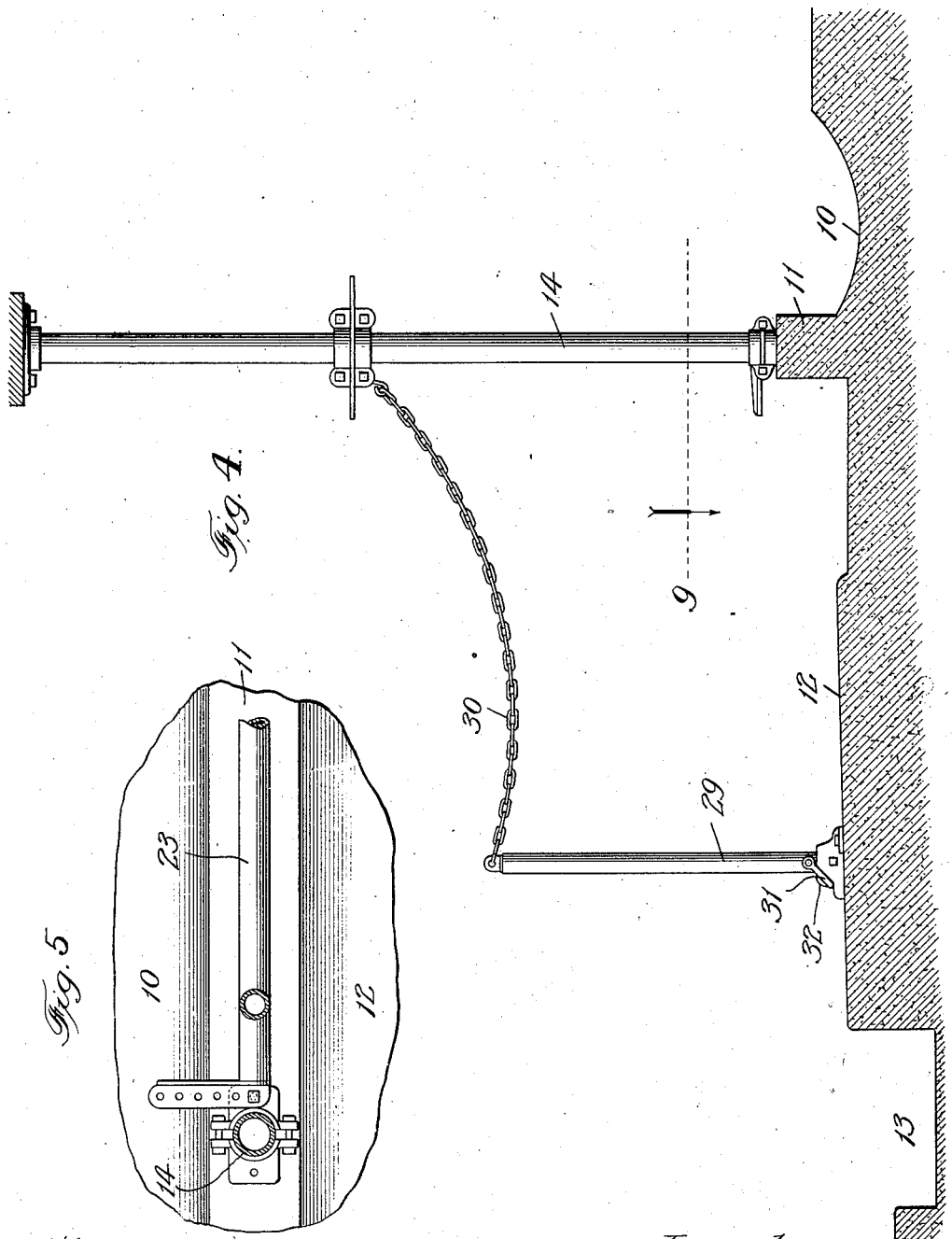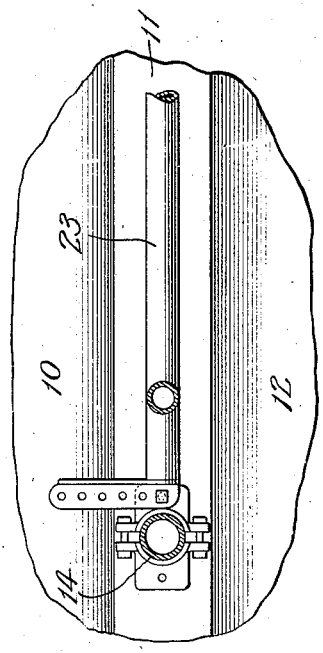

HENRY L. FERRIS AND HOWARD J. FERRIS, OF HARVARD, ILLINOIS, ASSIGNORS TO HUNT, HELM, FERRIS & COMPANY, OF HARVARD, ILLINOIS, A CORPORATION OF ILLINOIS.

ANIMAL-STALL.

1,066,194.         Specification of Letters Patent.         Patented July 1, 1913.

Application filed October 18, 1911. Serial No. 655,344.

*To all whom it may concern:*

Be it known that we, HENRY L. FERRIS and HOWARD J. FERRIS, citizens of the United States, residing at Harvard, in the county of McHenry and State of Illinois, have invented a new and useful Improvement in Animal-Stalls, of which the following is a specification.

Our invention relates to certain new and useful improvements in animal stalls, and is fully described and explained in the specification and shown in the accompanying drawings in which:

Figure 1 is a side elevation of the stall embodying our invention; Fig. 2 is a horizontal section in the line 2 of Fig. 3; Fig. 3 is a vertical section in the line 3 of Fig. 1; Fig. 4 is a side elevation of a modified form of construction, and Fig. 5 is a section in the line 9 of Fig. 4.

Referring to the drawings, 10 is a feed trough in which the hay, or other feed, may be placed, an open-bottom manger being used, or not, in connection with this trough as may be desired. To the rear of this feed trough is a sill 11 separating the feed trough from the floor of the stall which is indicated by 12. To the rear of the stall is a gutter 13 adapted to receive the droppings from the animal occupying the stall. In accordance with modern sanitary practice, it is the custom to build the feed trough, the sill, the floor of the barn and the gutter all of concrete, in the integral form illustrated, although, there are many barns in which similar parts are built of wood. In the use of a stall built upon a floor construction of this character, it is necessary that the position which the animal normally occupies, with reference to the length of the stall, shall be adjustable. It is necessary, or at least highly desirable, that in all cases the rear of the animal shall come substantially at the edge of the gutter, so that all of the droppings will enter the gutter and none will fall upon the floor of the stall so as to be mixed with the bedding. The advantage of this predetermined position of the animal is manifest from a sanitary point of view.

Prior to our invention an effort had been made to accomplish this object by providing, for the stanchion, which sometimes occupies the front end of the stall, an adjustable mounting in the forward end of the stall framework. The stanchion was thus moved forward for a long cow and backward for a short cow. This arrangement was open to some objections which are overcome by our present invention. The present invention consists, broadly speaking, in adjusting the entire end frame of the stall longitudinally of the stall instead of adjusting merely the stanchion. Several embodiments of the invention are here shown. In the first form, that of Figs. 1, 2 and 3, the end-frame of the stall is made entirely of chains, so as to be flexible, and it carries a stanchion as will be described in detail hereafter. In a device of this character it is wholly impossible to adjust the stanchion at all with reference to the end-frame of the stall.

In the form of construction shown in Figs. 4 and 5, the stall has no sides.

Other modifications and variations of the broad idea herein disclosed are illustrated in Letters Patent No. 988,561, granted May 4th, 1911, to Henry L. Ferris, the subject matter of that patent being certain specific means for carrying into effect the present broad invention. A further modification is shown in the application of Henry L. Ferris, Serial No. 631,430, filed June 5th, 1911, upon certain other specific mechanisms for carrying into effect the present broad invention. Upon inspection of those devices, other disadvantages of adjusting the stanchion within its frame appear. For instance, in the construction of the Letters Patent 988,561, it will be seen that the stanchion when open rests against the side of the frame. Were the stanchion adjustable longitudinally of the stall with reference to its frame, the stanchion would have to be swung upon its pivots to stand at an angle to reach this side and it would then occupy a position where it would be very difficult for the animal to get its head in the proper position. In the present device, as has been stated the entire stall-end is adjustable and the stanchion occupies a fixed position with reference to the stall-end, so that these various disadvantages are overcome.

Referring to the construction shown in Figs. 1 to 3, 14 are posts which may be and preferably are used in supporting the ceiling overhead. These posts rest upon the sill 11. Stall-sides 15 run backward from these posts and down to the floor, in the manner illustrated. Each post carries two flat webs 16 and 17, provided with a plurality of holes arranged in longitudinal series. The webs 16, 17 on the two sides of each stall are connected together by chains 18 and 19, at bottom and top, respectively. These chains 18 and 19 are connected by vertical chains 20 so that the top and bottom chains 18 and 19 and the vertical chains 20 make a rectangular frame, which is in effect the end of the stall. Swiveled between the chains 18 and 19 is a stanchion 21, which may be of any desired sort, preferably of that type in which, when open, the open side rests against the side of the frame. In the particular stanchion illustrated, a forked piece 22 is provided which can engage with one of the chains 20 so as to support the open-side of the stanchion. This type of stall-end is such that by reason of the flexibility of the chain-frame the stanchion may be moved back and forth longitudinally of the stall for a considerable distance, but the stanchion is absolutely immovable sidewise in either direction. In this way an ideal stanchion support is obtained. In order to accommodate the stall thus made to animals of various lengths, the entire end-frame with the stanchion in place in it, is shifted bodily lengthwise to bring it nearer the gutter or farther therefrom, the holes in the webs 16 and 17 being provided for this purpose. It would be manifest that in a device of this character the stanchion could not be adjusted in the frame at all, first, because when opened and resting against the side of the frame the stanchion in the frame would have to set at an angle; and, second, because the chains forming the end-frame of the stall are so flexible that they would not carry a stanchion except in their own plane.

In the construction of Figs. 4 and 5 there are no rigid stall-sides. The vertical posts 14 are provided and the end-frame is made longitudinally adjustable between the same, in the manner of the Ferris application Serial No. 631,430, or if desired the chain-frame of Figs. 1 to 3 may be placed between the posts. In this construction, however, posts 29 are pivotally mounted upon the floor of the building and carry chain stall-sides 30. The posts 29 are normally held up by loops 31 engaging studs 32, and by raising the loops 31 the posts 29 may be dropped flat onto the floor.

The patent to Ferris herein referred to may be said to contain one specific embodiment of the present broad invention, that is to say, a specific embodiment in which the frames are made adjustable along the stall-sides, although certain claims of that patent are drawn to specific adjusting mechanism which may be used in other forms of construction from the one in that patent and, in fact, forms the most convenient method now known to us of adjusting a rigid frame. The present broad invention is, however, wholly independent of the mechanism set forth in that patent. For instance, in the form of construction shown in Figs. 1 to 3, a large part at least of the subject matter of that patent is wholly omitted.

The present invention then is very broad in the means by which it can be carried into effect, and it produces a multitude of advantages already pointed out, some of which inhere in one construction embodying it and some in another, but by its use in its various forms the most desirable form of construction so far built is obtained. Therefore, realizing the great variation which is possible, we do not intend to limit ourselves to any of the specific forms, or any specific form, except as pointed out in the following claims in which it is our intention to claim the broad novelty inherent in the construction as broadly as is permitted by the state of the art.

The word "stall" is used herein in the broad sense of a place where cattle stand or lie, there being no intention to limit the term to a construction having sides, as a single stall or series of stalls may be built without any lateral boundaries.

We claim as new and desire to secure by Letters Patent—

1. In combination, a stall-floor, a gutter to the rear thereof, a frame at the front comprising a pair of horizontal spaced members and a pair of vertical spaced members connected to the horizontal members, a stanchion secured at its ends to the horizontal members intermediate the vertical members, and means for adjusting the frame with the stanchion therein longitudinally of the stall, whereby when the stanchion is opened with its open member resting against the adjacent vertical member of the frame the stanchion will stand at right-angles to the path of movement of the animal when entering the stall and placing its head in the stanchion irrespective of the position to which the stanchion has been adjusted.

2. In combination, a stall-floor, a gutter to the rear thereof, a frame at the front comprising a pair of horizontal spaced members and a pair of vertical spaced members connected to the horizontal members, a stanchion secured at its ends to the horizontal members intermediate the vertical members, means adapted to connect the movable member of the stanchion and the adjacent vertical member of the frame when the stanchion is opened to prevent rotation of the stanchion, and means for adjusting the frame with the stanchion therein longitudinally of the stall, whereby when the stanchion is opened with its open member resting against the adjacent vertical member of the frame the stanchion will stand at right-angles to the path of movement of the animal when entering the stall and placing its head in the stanchion irrespective of the position to which the stanchion has been adjusted.

In testimony whereof we hereunto set our hands this 11th day of October, 1911.

HENRY L. FERRIS.
HOWARD J. FERRIS.

In the presence of two subscribing witnesses:
R. N. JACOBS,
JAMES DAVIDSON.